United States Patent
Trede et al.

(10) Patent No.: US 6,672,625 B2
(45) Date of Patent: Jan. 6, 2004

(54) SEPARABLE RAPID-ACTION COUPLING WITH SAFETY LOCK

(75) Inventors: Michael Trede, Habsheim (FR); Jean-Martin Henlin, Waldighoffen (FR); Daniel Martin-Cocher, Grenoble (FR)

(73) Assignee: A. Raymond & Cie, Grenoble (FR)

( * ) Notice: Subject to any disclaimer, the term of this patent is extended or adjusted under 35 U.S.C. 154(b) by 32 days.

(21) Appl. No.: 09/862,912

(22) Filed: May 22, 2001

(65) Prior Publication Data

US 2002/0125717 A1 Sep. 12, 2002

(30) Foreign Application Priority Data

May 24, 2000 (DE) .......................................... 100 25 817

(51) Int. Cl.$^7$ ................................................ F16L 35/00
(52) U.S. Cl. ......................... 285/81; 285/305; 285/921
(58) Field of Search ................................ 285/319, 313, 285/921, 305, 308, 81

(56) References Cited

U.S. PATENT DOCUMENTS

| | | | | |
|---|---|---|---|---|
| 4,913,467 A | * | 4/1990 | Washizu | 285/39 |
| 5,069,424 A | | 12/1991 | Dennany, Jr. et al. | |
| 5,090,747 A | * | 2/1992 | Kotake | 285/305 |
| 5,292,157 A | | 3/1994 | Rubichon | |
| 5,374,088 A | | 12/1994 | Moretti et al. | |
| 5,395,140 A | * | 3/1995 | Wiethorn | 285/93 |
| 5,628,531 A | * | 5/1997 | Rosenberg et al. | 285/81 |
| 6,082,779 A | * | 7/2000 | Lesser et al. | 285/93 |
| 6,089,616 A | * | 7/2000 | Trede et al. | 285/93 |
| 6,318,764 B1 | * | 11/2001 | Trede et al. | 285/305 |

* cited by examiner

Primary Examiner—Lynne H. Browne
Assistant Examiner—Aaron Dunwoody
(74) Attorney, Agent, or Firm—Gifford, Krass, Groh, Sprinkle, Anderson & Citkowski, P.C.

(57) ABSTRACT

A separable rapid-action coupling serves for connecting fluid lines includes a tubular plug-in part with a circumferential holding rib, a coupling housing with a cylindrical receptacle cavity for the plug-in part and a separate holding element. The holding element has elastically expandable holding edges that are radially directed into the receptacle cavity. The holding edges engage behind the holding rib after insertion of the plug-in part. A safety clip with a second locking mechanism is situated in front of the plug-in opening of the housing in case the snap-in mechanism of the holding element fails. The safety clip includes a frame that fits on the end face of the coupling housing and two elastically expandable clips that engage corresponding projections on the coupling housing. The safety clip has snap-in fingers that can be inserted into the receptacle cavity. The front ends of the snap-in fingers are supported on the holding rib of the fully engaged plug-in part while snap-in tabs that protrude outward from the snap-in fingers are directed toward the rear simultaneously engage behind contact edges that inwardly protrude from the housing wall. This safety clip can be inexpensively manufactured from a plastic material and easily preassembled on the coupling housing for the intended purpose. In addition, a centrally arranged support ring and the corresponding arrangement of the snap-in fingers on the support ring and on the frame make it possible to design the safety clip in such a way that it is pulled into the receptacle cavity simultaneously with the insertion of the plug-in part and the snap-in tabs are automatically moved into their locking position.

11 Claims, 4 Drawing Sheets

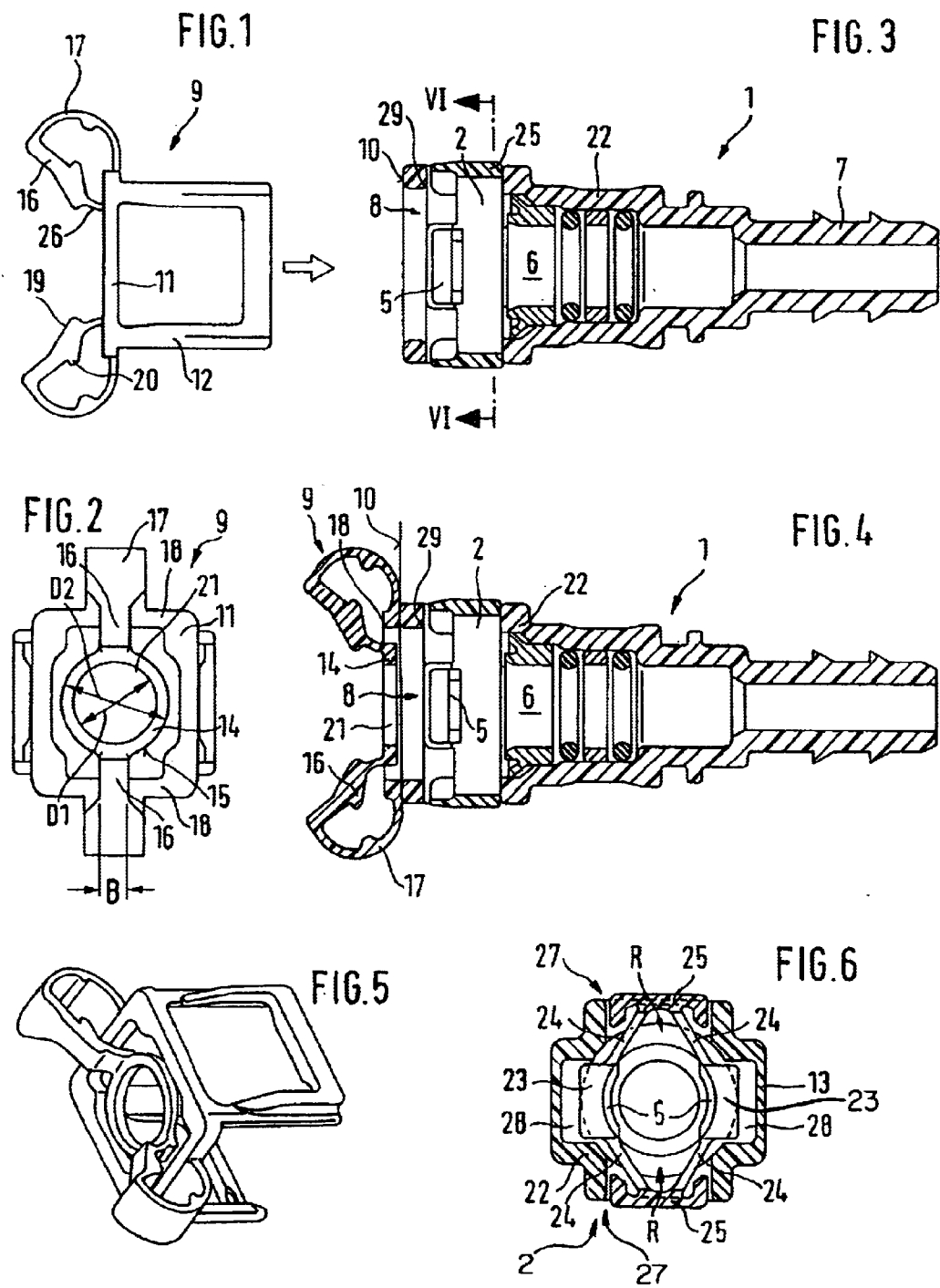

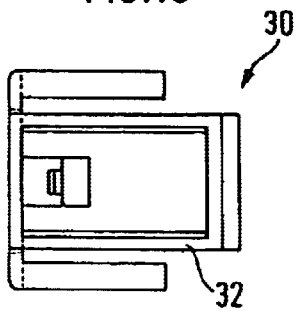
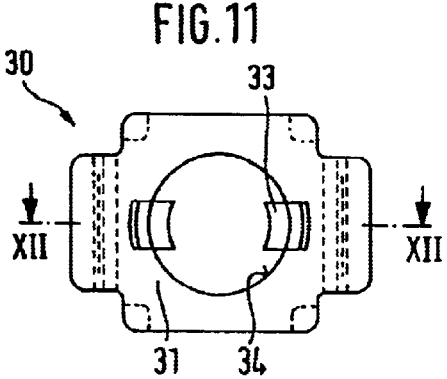
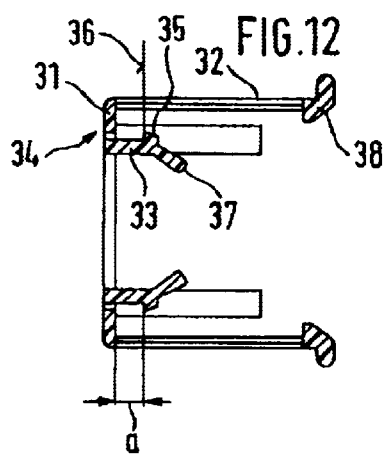
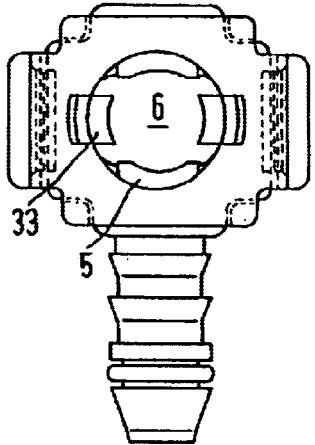
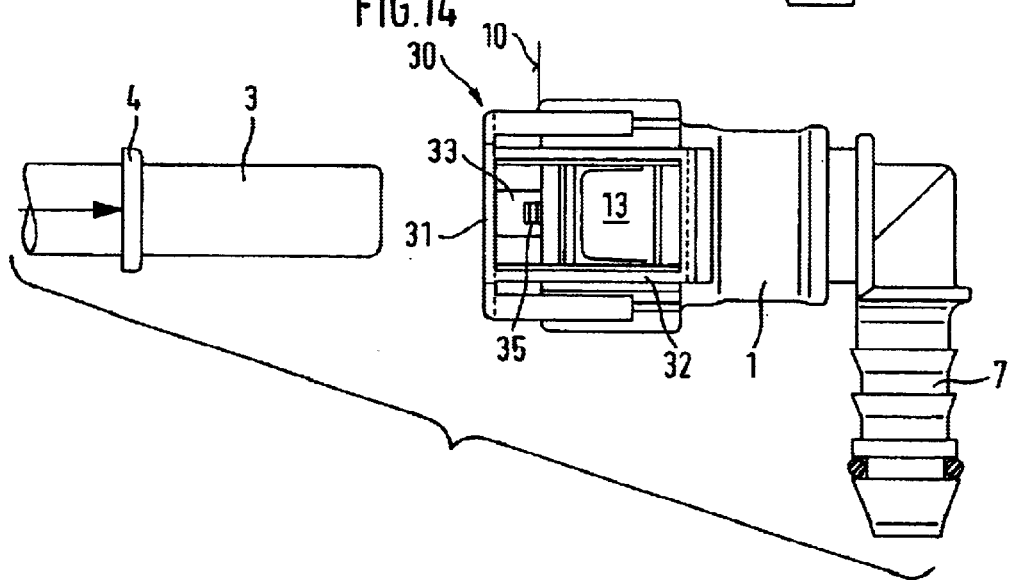

SEPARABLE RAPID-ACTION COUPLING WITH SAFETY LOCK

FIELD OF THE INVENTION

The present invention pertains to a rapid-action coupling with a safety lock for connecting fluid lines, in particular, fuel lines in the manufacture of automobiles. This rapid-action coupling includes of a tubular plug-in part with a circumferential holding rib, a coupling housing with a cylindrical receptacle cavity and a separate holding element. The holding element has elastically expandable holding edges that are radially directed into the receptacle cavity and engage behind the holding rib after the insertion of the plug-in part. A safety clip that can be positioned in front of the opening of the housing and is provided with a second locking mechanism in case the snap-in mechanism of the holding element fails.

BACKGROUND OF THE INVENTION

A rapid-action coupling is shown in U.S. Pat. No. 5,069,424. The safety clip that is discussed in this publication (and referred to as a "redundant clip") encompasses the tubular plug-in part directly behind the holding rib by means of a clamp. The clip includes two inwardly bent fingers on the ends of two arms that outwardly extend around the opening in the housing. These fingers engage into a circumferential groove arranged on the outside of the housing body when the plug-in part has reached its completely engaged position in the receptacle cavity of the coupling housing. That is, the fingers engage when the snap-in fingers of the holding spring engage behind the holding rib after the insertion of the plug-in part. If the primary snap-in mechanism fails, for whatever reason, the plug-in part is still held by the safety clip, the clamp of which then presses against the holding rib. This safety clip not only provides a second locking mechanism, but simultaneously represents a visual indication for the secure locking of the plug-in part.

One disadvantage of this rapid-action coupling is that the safety clip needs to be manufactured from spring steel so as to be able to withstand the high retention forces occurring in the worst-case scenario. In order to ensure the proper function of the safety clip, it is also necessary to initially press the safety clip onto the pipe section situated in front of the holding rib and to insert the safety clip into the receptacle cavity together with the plug-in part. Both snap-in fingers need to be manually bent apart during this process such that the snap-in fingers are able to engage into the grooves when they are moved over the head of the coupling housing. This means that the assembly of the two parts is extremely complicated and requires skilled assembly personnel.

SUMMARY OF THE INVENTION

The present invention is based on the objective of designing a rapid-action coupling with a safety lock that can be positioned and fixed in front of the plug-in opening separately from the plug-in part. Also, the locking means can be easily moved into their locking position after the plug-in part is locked in the holding element.

According to the present invention, the safety clip includes a frame that is adapted to the end face of the coupling housing and can be locked on the corresponding outer projections of the coupling housing by means of two elastically expanding clips. The frame is connected to snap-in fingers that can be inserted into the receptacle cavity. The front ends of the fingers can be supported on the holding rib of the fully engaged plug-in part. Snap-in tabs that are directed toward the rear and outwardly protrude from the snap-in fingers simultaneously engage behind contact edges that inwardly protrude from the housing wall.

In some embodiments, the frame contains a support ring that is centrally arranged in the plane of the frame. The inside diameter of the support ring is slightly larger than the outside diameter of the plug-in part. The outside diameter of the support ring is identical to the outside diameter of the holding rib. The snap-in fingers are integrally formed onto the outer edge of the support rib in such a way that they are able to elastically expand diagonally outward opposite to the inserting direction. The snap-in fingers are automatically supported on the holding ring when the support ring is installed into the receptacle cavity and simultaneously engage behind the inwardly protruding contact edges. Consequently, when the plug-in part is inserted, the support ring may be simultaneously pulled into the receptacle cavity by the holding rib such that the locking elements are automatically moved into their locking position. A clip according to the present invention can be advantageously manufactured from a hard-elastic plastic material.

According to one preferred embodiment of the invention, one end of each of the snap-in fingers is integrally formed onto the outer edge of the support ring. The other ends of the snap-in fingers are flexibly connected to two opposing side walls of the frame via bridge webs that are integrally formed onto those ends in an approximately semicircular fashion. The snap-in fingers are respectively provided with one inwardly directed and one outwardly directed snap-in tab. The two inwardly directed snap-in tabs engage behind the holding rib after the insertion of the plug-in part. The two outwardly directed snap-in tabs are supported on the contact edges of the housing wall. The snap-in fingers are pulled outward by the spring force of the bridge webs if they are not properly engaged. In addition, the compressed bridge webs provide a visual indication for the proper function of the safety clip.

A conventional rapid-action plastic coupling has a holding element with opposing holding edges that are integrally formed onto support bodies. The support bodies are connected to pressure plates at their ends via resilient webs that converge in the shape of a V. The pressure plates protrude outward through corresponding openings in the housing wall such that they can be externally depressed in order to separate the coupling. The support bodies protrude into bays that are laterally recessed into the housing wall and yield into the bays when the pressure plates are depressed. In this type of plastic coupling, it is advantageous if the snap-in fingers have such a width that they can be inserted into and locked in the free space between the resilient webs, and if the outer snap-in tabs can be supported on the front edge of the opening underneath the pressure plates viewed in the inserting direction. This provides the advantage that the safety clip can be subsequently retrofitted into finished coupling housings. That is, the safety clip can be installed without requiring any additional modifications.

BRIEF DESCRIPTION OF THE DRAWINGS

Additional characteristics and advantages of the invention are disclosed and discussed below in connection with a description of the figures. Two embodiments of the coupling according to the invention are illustrated in the figures.

FIG. 1 is a side view of a safety clip according to the present invention;

FIG. 2 is a front view of the clip of FIG. 1;

FIG. 3 is a longitudinal cross-sectional view of the coupling housing of FIG. 3, taken along line VI—VI, with the holding element installed;

FIG. 4 is a longitudinal cross-sectional view of the coupling housing of FIG. 3 with an attached safety clip;

FIG. 5 is a perspective view of a safety clip according to the present invention;

FIG. 6 is a cross-sectional view through the receptacle cavity of the coupling housing within the region of the holding element;

FIG. 10 is a side view of another embodiment of a safety clip according to the present invention;

FIG. 11 is a front view of the safety clip of FIG. 10;

FIG. 12 is a cross-sectional view of the clip taken along line XII—XII in FIG. 11;

FIG. 13 is a front view of a coupling housing with an attached safety clip;

FIG. 14 is a side view of the coupling housing of FIG. 13 with the attached safety clip, before the insertion of the plug-in part;

DETAILED DESCRIPTION OF THE INVENTION

Figure 7:
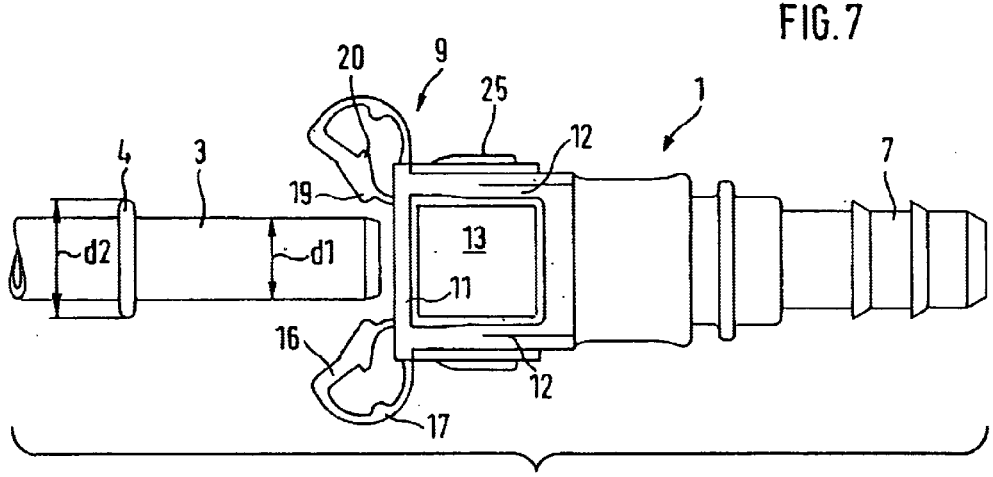
FIG. 7 is a side view of a rapid-action coupling with attached safety clip before the insertion of the plug-in part.

The separable rapid-action coupling which is illustrated in the Figures serves for connecting fluid lines, in particular, fuel lines in the manufacture of automobiles. The coupling includes a coupling housing 1, shown in FIG. 3, which contains a cylindrical receptacle cavity 6 for inserting a tubular plug-in part 3. The plug-in part is illustrated in FIG. 7 and is provided with a circumferential holding rib 4. A separate holding element 2 is installed within the front plug-in region of the coupling housing 1. The holding element 2 has elastically expandable holding edges 5 that are radially directed into the receptacle cavity 6 of the coupling housing 1. After the plug-in part 3 has been completely inserted, these holding edges engage behind the holding rib 4 and thus ensure a reliable connection, with the front region of the plug-in part being sealed to the housing wall 22.

On its rear end, the coupling housing 1 is provided with a connection piece 7 that is connected to a fluid line (not shown). In this case, the plug-in part 3 may be formed by the end of a metal tube, in which the holding rib 4 is formed by creating a bead. However, the plug-in part may, analogous to the coupling housing, be manufactured from a rigid plastic material or another customary injection molding material and conventionally connected to a hose or pipeline by means of a similar connection piece.

FIG. 4 indicates that a safety clip 9 is arranged in front of the plug-in opening 8 of the housing 1. This safety clip is equipped with a second snap-in mechanism in case the primary snap-in mechanism of the holding element 2 fails or is unintentionally separated. This safety clip 9 includes a frame 11 that fits onto the end face 10 of the coupling housing 1. The clip 9 has two elastically expandable clips 12 that are integrally formed onto two opposing sides of the frame 11. These clips engage corresponding projections 13 on the coupling housing 1 (see FIG. 7).

A support ring 14 is dispensed in the center of the frame 11 and approximately in the plane of the frame. The inside diameter D1 of the support ring is slightly larger than the outside diameter d1 of the plug-in part 3. Therefore, the plug-in part 3 can be inserted into the through-hole 21 in the ring 14 until the holding rib 4 contacts the support ring 14. The outside diameter D2 of the support ring 14 is identical to the outside diameter d2 of the holding rib 4, or slightly smaller, such that this support ring 14 can be inserted together with the holding rib 4 to such a degree that it is situated behind the holding edges 5 of the holding element 2 when the plug-in part 3 is inserted.

Two outwardly directed snap-in webs 16 are integrally formed onto the outer edge 15 of the support ring 14 such that they are situated opposite one another. The webs 16 are attached to the outer edge 15 by means of film hinges 26. On their free ends, these snap-in webs 16 are flexibly connected to two opposing side walls 18 of the frame 11 by means of approximately semicircular bridge webs 17. The snap-in webs 16 are each provided with one inwardly directed and one outwardly directed snap-in tab 19 and 20, respectively. The inwardly directed snap-in tabs 19 are intended for engaging behind the holding rib 4 after the insertion of the plug-in part 3 and the engagement of the holding edges 5. A corresponding design of the receptacle cavity 6 simultaneously ensures that the outer snap-in tabs 20 can be supported on the corresponding contact edges. The safety clip 9 provides a supplementary lock in addition to the primary lock in the holding element 2. However, this supplementary lock is only actuated in case the primary lock fails.

FIG. 6 is a cross-sectional view of one preferred embodiment of the holding element 2 for the intallation of a safety clip 9. In this holding element, the opposing holding edges 5 are integrally formed onto support bodies 23. The ends of the support bodies are connected to pressure plates 25 by means of resilient webs 24 that converge in the shape of a V. These pressure plates protrude outward through corresponding openings 27 in the housing wall 22 and can be externally depressed in order to separate the coupling. The support bodies 23 are embedded in bays 28 in the housing wall 22 and can be laterally moved apart from one another in a resilient fashion when the pressure plates 25 are depressed. This disengages the holding edges 5 and the plug-in part 3 can be separated from the coupling housing 1.

Referring now to FIGS. 2 and 6, the snap-in webs 16 have a width "B" that can be easily inserted into the free space R between the resilient webs 24. Due to this, the safety clip 9 can be retrofitted into couplings with holding elements 2 of this type without requiring additional modifications.

Figure 8:
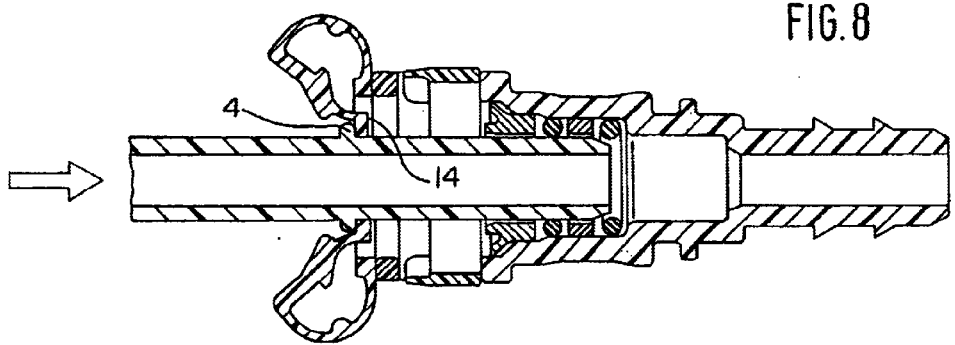
FIG. 8 is a cross-sectional view of the rapid-action coupling of FIG. 7 with a partially inserted plug-in part.
Figure 9:
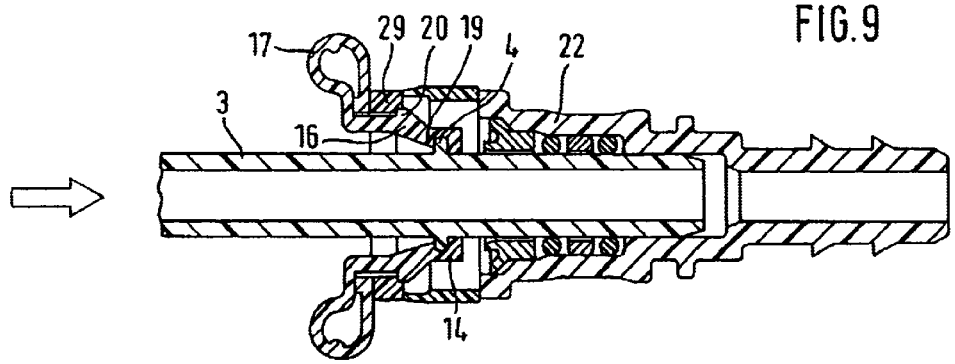
FIG. 9 is a cross-sectional view similar to FIG. 8 with the plug-in part completely inserted and double-locked.

FIGS. 7–9 show the supplementary locking function of the safety clip 9 when the plug-in part 3 is inserted into the receptacle cavity 6 of the coupling. FIG. 7 shows the rapid-action coupling with attached safety clip 9 before the insertion of the plug-in part 3. In FIG. 8, the plug-in part 3 is inserted into the receptacle cavity 6 to such a degree that the holding rib 4 engages the support ring 14. This support ring participates in the additional insertion into the receptacle cavity 6 and pulls the snap-in webs 16 into the free space R between the resilient webs 23 against the spring force of the bridge webs 17 until the outwardly directed snap-in tabs 20 engage on the front edge 29 of the opening 27 underneath the pressure plates 25 viewed in the inserting direction (FIG. 9). The inwardly directed snap-in tabs 19 simultaneously engage behind the holding rib 4 on the same side as the holding edges 5 such that the plug-in part 3 is doubly secured in this position.

The pressure plates 25 preferably have such a thickness that they simultaneously disengage the holding edges 5 of the holding element 2 and the snap-in tabs when the pressure plates are depressed in order to separate the coupling.

FIGS. 10–12 show another embodiment of a safety clip 30 according to the present invention. FIG. 13 indicates that this safety clip also includes a frame 31 that fits onto the end face 10 of the coupling housing 1 and can be engaged on corresponding outer projections 13 of the coupling housing 1 by means of two elastically expandable clips 32. The frame 31 is also connected to snap-in fingers 33 that can be inserted into the receptacle cavity 6. However, these snap-in fingers are, in contrast to the first embodiment, integrally formed onto the inner edge 34 of the frame 31 such that they extend in the opposite direction, i.e., in the inserting direction.

Analogous to the first embodiment, the snap-in fingers 33 contain snap-in tabs 35 that protrude outward from approximately the center of the snap-in fingers, with the contact edges 36 of these snap-in tabs being directed toward the rear. The snap-in fingers extend axially parallel from the frame 31 to the snap-in tab 35 and are subsequently directed diagonally inward, with the finger ends 37 being supported on the holding ring 4 of the fully engaged plug-in part 3.

Figure 15:
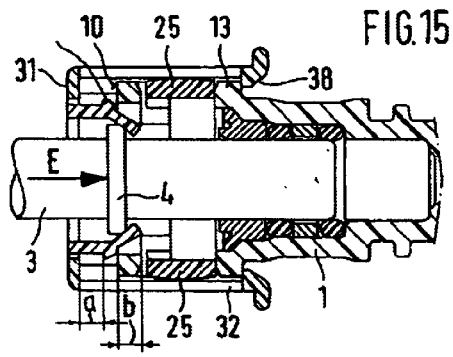
FIG. 15 is a cross-sectional view of the coupling housing of FIG. 14 during the insertion of the plug-in part.

The distance "a" between the contact edge 36 of the snap-in tab 35 and the inner side of the frame 31 is identical to the distance "b" between the end face 10 and the contact edge 29 in this case (see FIG. 15).

The operation of the safety clip 30 is illustrated in FIGS. 15–22 and described below.

FIG. 15 shows a section through the coupling housing 1 with attached safety clip 30. The snap-in hooks 38 of the clips 32 are engaged on the projections 13 of the housing 1 while the rear side of the snap-in tabs 35 is situated in front of the end face 10. During the insertion of the plug-in part 3 in the direction of the arrow "E" (see FIG. 16), the finger ends 37 which diagonally point toward the center are pressed outward by the holding rib 4 and elastically returned into their original position once the holding rib 4 has passed the narrowing. The plug-in part 3 is now additionally inserted into the housing 1 until the holding rib 4 is engaged behind the holding edges 5 of the holding element 2 (see FIG. 17, and FIG. 18 which is turned by 90°).

Figure 19:
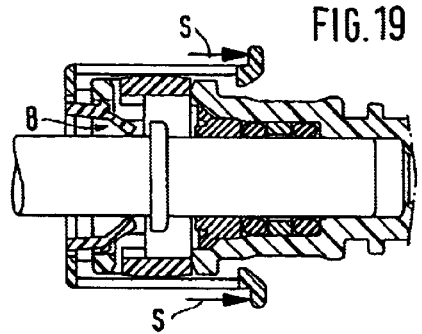
FIG. 19 is a cross-sectional view of the coupling housing with the engaged plug-in part during the attachment of the safety clip.
Figure 16:
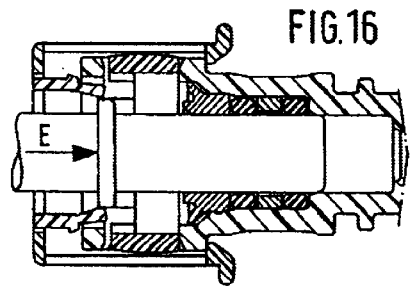
FIG. 16 is a view similar to FIG. 15 during the additional insertion of the plug-in part.
Figure 20:
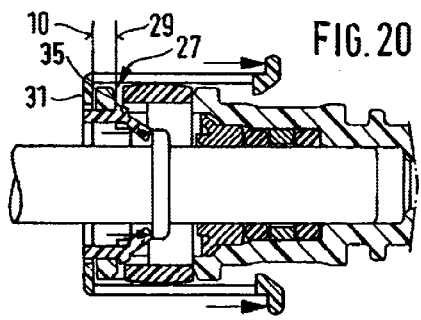
FIG. 20 is a view similar to FIG. 19 after the attachment of the safety clip and the engagement of the snap-in fingers.
Figure 17:
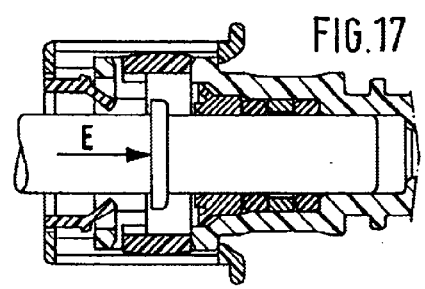
FIGS. 17 is a view similar to FIGS. 15 and 16 with the plug-in part completely inserted.

FIG. 19 indicates that the safety clip 30 is pushed over the housing 1 in the direction of the arrow "S." The snap-in tabs 35 are forced into the plug-in opening 8. The snap-in fingers 33 yield inwardly until the snap-in tabs 35 have passed the narrowing and their contact edges engage behind the inner edges 29 of the pressure plate opening 27. At this point, the frame 31 adjoins the end face 10 with its inner side and the finger ends 37 are simultaneously supported on the rear side of the holding rib 4 such that the plug-in part 3 is doubly secured in the receptacle cavity 6 (see FIG. 20).

Figure 21:
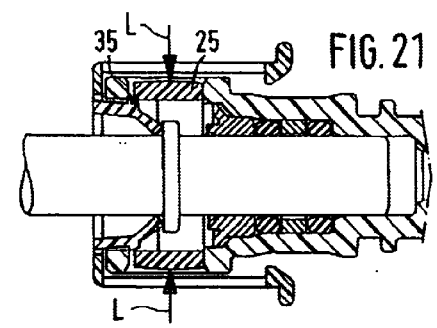
FIG. 21 is a view similar to FIGS. 19 and 20, showing the first stage of the separation of the plug-in part and the safety clip from the coupling housing.
Figure 18:
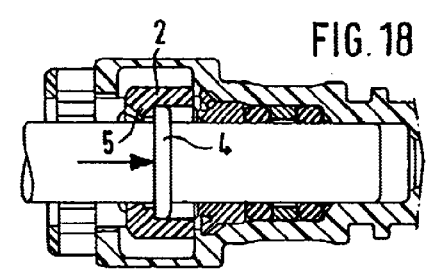
FIG. 18 is a view of the coupling of FIG. 17, with the cross-section turned by 90° and with a section through the holding edges.
Figure 22:
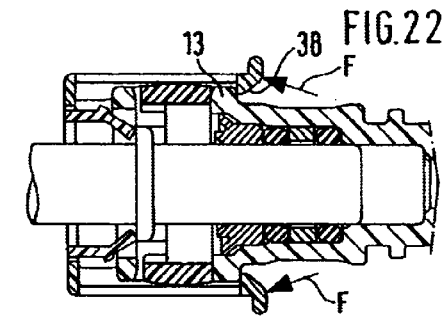
FIG. 22 is a view similar to FIGS. 19–21, showing the second stage of the separation of the safety clip from the housing in order to release the plug-in part.

In order to separate the coupling, the pressure plates 25 are initially depressed in the direction of the arrow "L" as shown in FIG. 21. During this process, the holding edges 5 are elastically moved apart from one another and the snap-in tabs 35 are pressed inward until they are released from the contact edge 29. The safety clip 30 is then pushed toward the left until contact of the snap-in hooks 38 on the projections 13 and the resilient clips 32 are then moved apart from one another in the direction of the arrow "F" until their snap-in hooks 38 are disengaged from the projections 13 and the plug-in part 3 can be entirely pulled out (see FIG. 22).

What is claimed is:

1. A separable rapid-action coupling for connecting fluid lines, comprising:
   a tubular plug-in part with a circumferential holding rib;
   a coupling housing with a cylindrical receptacle cavity with a plug-in opening, and a separate holding element, the holding element serving as a first locking mechanism and having elastically expandable holding edges extending radially into the receptacle cavity and to engage the holding rib after insertion of the plug-in part; and
   a safety clip configured to be positioned in front of the plug-in opening of the housing and operable to provide a second locking mechanism in case the holding element fails, the safety clip comprising:
      a frame configured to engage an end face of the coupling housing and to lock on corresponding outer projections of the coupling housing by means of two elastically expandable clips, and
      at least one snap-in finger connected to the frame, the finger being insertable into the receptacle cavity and having a front end which is supported on the holding rib of the fully engaged plug-in part and at least one snap-in tab that is directed away from the front end and protruding outwardly from the snap-in finger, the snap-in tab simultaneously engaging an edge which extends inwardly from a wall of the housing.

2. The separable rapid-action coupling according to claim 1, wherein the frame includes a support ring centrally disposed in the plane of the frame, the ring having an inside diameter which is slightly larger than an outside diameter of the plug-in part, and an outside diameter which is substantially identical to an outside diameter of the holding rib, the snap-in finger being integrally formed onto an outer edge of the support ring to elastically expand diagonally outward opposite to the inserting direction, such that the snap-in finger is supported on the holding rib when the support ring is installed into the receptacle cavity and simultaneously engages the inwardly protruding contact edge.

3. The separable rapid-action coupling according to claim 2, wherein one end of each of the snap-in fingers is integrally formed onto the outer edge of the support ring, and the other end of each of the snap-in fingers is flexibly connected to two opposing side walls of the frame via a bridge web that is integrally formed onto the other end in an approximately semicircular fashion, the snap-in finger being provided with one inwardly directed and one outwardly directed snap-in tab, the inwardly directed snap-in tab engaging the holding rib after insertion of the plug-in part, and the outwardly directed snap-in tab being supported on the contact edge of the housing wall.

4. The separable rapid-action coupling according to claim 3, wherein a holding edge of the holding element is integrally formed onto a support body, the support body being connected to a pressure plate by a pair of resilient webs that converge in the shape of a V, the pressure plate protruding outwardly through a corresponding opening in the housing wall such that the plate can be externally depressed in order to separate the coupling, the support body protruding into a bay that is laterally recessed into the housing wall and yield into the bay when the pressure plate is depressed, the snap-in finger has such a width that the finger can be inserted into and locked in a free space between the pair of resilient webs.

5. The separable rapid-action coupling according to claim 4, wherein the outwardly directed snap-in tab is supported on a front edge of the opening in the housing wall underneath the pressure plate when viewed in the inserting direction.

6. The separable rapid-action coupling according to claim 5, wherein the pressure plate has a thickness such that the plate simultaneously disengages the holding edge of the holding element and the outwardly directed snap-in tab when depressed.

7. The separable rapid-action coupling according to claim 1, wherein the snap-in tab and subsequently extends diagonally inwardly, with the distance between the contact edge of the snap-in tab and the inner side of the frame being substantially identical to the distance between the end face and the contact edge.

8. A separable rapid-action coupling for connecting fluid lines, comprising:
   a tubular plug-in part having a circumferential holding rib;
   a coupling housing having a cylindrical receptacle cavity and a separate holding element, the holding element having an elastically expandable holding edge that extends radially into the receptacle cavity and to engage the holding rib after insertion of the plug-in part, the housing further having a wall with a pair of inwardly protruding contact edges; and
   a safety clip configured to attach to the coupling housing, the safety clip having:
      a frame configured to grip the coupling housing;
      a support ring disposed generally in a center of the frame, the support ring being sized to receive the plug-in part; and
      a pair of snap-in fingers supported by the frame, the snap-in fingers having first ends configured to engage the holding rib when the plug-in part is inserted, each finger further having a rearwardly directed and outwardly protruding snap-in tab configured to engage one of the contact edges of the coupling housing when the plug-in part is inserted, the first ends of the snap-in fingers being flexibly interconnected with the ring such that when the plug in part is inserted into the support ring, the support ring engages the holding rib and is drawn into the receptacle, and the snap in fingers are drawn into the receptacle with the first ends engaging the holding rib.

9. A separable rapid-action coupling for connecting fluid lines, comprising:
   a tubular plug-in part having a circumferential holding rib;
   a coupling housing having a cylindrical receptacle cavity and a separate holding element, the holding element having an elastically expandable holding edge that extends radially into the receptacle cavity and to engage the holding rib after insertion of the plug-in part, the housing further having a wall with a pair of inwardly protruding contact edges; and a safety clip configured to attach to the coupling housing, the safety clip having:
      a frame configured to grip the coupling housing; and
      a pair of snap-in fingers supported by the frame, the snap-in fingers having first ends configured to engage the holding rib when the plug-in part is inserted and second ends flexibly interconnected with the frame, each finger further having a rearwardly directed and outwardly protruding snap-in tab configured to engage one of the contact edges of the coupling housing when the plug-in part is inserted.

10. A separable rapid-action coupling for connecting fluid lines, comprising:
   a tubular plug-in part having a circumferential holding rib;
   a coupling housing having a cylindrical receptacle cavity and a separate holding element, the holding element having an elastically expandable holding edge that extends radially into the receptacle cavity and to engage the holding rib after insertion of the plug-in part, the housing further having a wall with a pair of inwardly protruding contact edges; and
   a safety clip configured to attach to the coupling housing, the safety clip having:
      a frame configured to grip the coupling housing; and
      a pair of snap-in fingers supported by the frame, the snap-in fingers having first ends configured to engage the holding rib when the plug-in part is inserted, the first end of each of the snap-in fingers including an inwardly directed snap-in tab for engaging the holding rib each finger further having a rearwardly directed and outwardly protruding snap-in tab configured to engage one of the contact edges of the coupling housing when the plug-in part is inserted.

11. As parable rapid-action coupling for connecting fluid lines, comprising:
   a tubular plug-in part having a circumferential holding rib;
   a coupling housing having a cylindrical receptacle cavity and a separate holding element, the holding element having an elastically expandable holding edge that extends radially into the receptacle cavity and to engage the holding rib after insertion of the plug-in part, the housing further having a wall with a pair of inwardly protruding contact edges; and
   a safety clip configured to attach to the coupling housing, the safety clip having:
      a frame configured to grip the coupling housing; and
      a pair of snap-in fingers supported by the frame, the snap-in fingers having first ends configured to engage the holding rib when the plug-in part is inserted, each finger further having a rearwardly directed and outwardly protruding snap-in tab configured to engage one of the contact edges of the coupling housing when the plug-in part is inserted;
   the holding element further comprising support bodies having the holding edges formed thereon, and pressure plates interconnected with the support bodies such that when the pressure plates are squeezed, the support bodies spread apart and the holding edges disengage from the holding rib, the support bodies being interconnected with the pressure plates by resilient webs and the snap-in fingers being sized to fit between the webs.

* * * * *

UNITED STATES PATENT AND TRADEMARK OFFICE
CERTIFICATE OF CORRECTION

PATENT NO. : 6,672,625 B2
DATED : January 6, 2004
INVENTOR(S) : Michael Trede, Jean-Martin Henlin and Daniel Martin-Cocher It is certified that error appears in the above-identified patent and that said Letters Patent is hereby corrected as shown below:

Column 4,
Line 53, replace "intallation" with -- installation --.

Column 7,
Line 19, replace "snap-in tab" with -- snap-in finger extends axially parallel up to a snap-in --
Lines 60 and 61, replace "element, the    with -- element, the holding --
                         holding"
                         (*no paraagraph after "the"*)
Line 65, replace "edges: and a safety" with -- edges: and
                                             a safety -- (*paragraph after "and"*)

Column 8,
Line 35, replace "As parable" with -- A separable --.

Signed and Sealed this

Fifteenth Day of February, 2005

JON W. DUDAS
*Director of the United States Patent and Trademark Office*